(12) United States Patent
Timonen et al.

(10) Patent No.: US 10,947,122 B2
(45) Date of Patent: Mar. 16, 2021

(54) METHOD FOR THE PRODUCTION OF LOW ASH ACTIVATED CHARCOAL

(71) Applicant: Vapo Oy, Jyväskylä (FI)

(72) Inventors: Mika Timonen, Jyväskylä (FI); Hannu Lamberg, Jyväskylä (FI)

(73) Assignee: Vapo Oy, Jyväskylä (FI)

( * ) Notice: Subject to any disclaimer, the term of this patent is extended or adjusted under 35 U.S.C. 154(b) by 253 days.

(21) Appl. No.: 16/067,822

(22) PCT Filed: Jan. 9, 2017

(86) PCT No.: PCT/FI2017/050006
§ 371 (c)(1),
(2) Date: Sep. 25, 2018

(87) PCT Pub. No.: WO2017/118781
PCT Pub. Date: Jul. 13, 2017

(65) Prior Publication Data
US 2020/0270136 A1 Aug. 27, 2020

(30) Foreign Application Priority Data
Jan. 8, 2016 (FI) ..................................... 20165011

(51) Int. Cl.
*C01B 31/08* (2006.01)
*C01B 32/348* (2017.01)
*C01B 32/318* (2017.01)
*C01B 32/336* (2017.01)

(52) U.S. Cl.
CPC .......... *C01B 32/348* (2017.08); *C01B 32/318* (2017.08); *C01B 32/336* (2017.08)

(58) Field of Classification Search
CPC .................................................. C01B 32/318
See application file for complete search history.

(56) References Cited

U.S. PATENT DOCUMENTS

| | | | |
|---|---|---|---|
| 4,153,420 A | 5/1979 | Myreen | |
| 4,477,257 A | 10/1984 | Koppelman et al. | |
| 7,662,747 B2* | 2/2010 | De Ruiter | B01J 20/20 |
| | | | 423/447.2 |
| 8,481,642 B2* | 7/2013 | Antonietti | C10L 5/44 |
| | | | 524/800 |
| 9,478,365 B2* | 10/2016 | Mitlin | C01B 32/184 |
| 9,758,738 B2* | 9/2017 | Seidner | C10L 1/322 |
| 2013/0004408 A1 | 1/2013 | Dua et al. | |

FOREIGN PATENT DOCUMENTS

| | | |
|---|---|---|
| FI | 20155081 A | 8/2016 |
| GB | 765069 A | 1/1957 |
| WO | WO2015025076 A1 | 2/2015 |

OTHER PUBLICATIONS

Mursito et al: Upgrading and dewatering of raw tropical peat by hydrothermal treatment. Fuel, IPC Science Ano Technology Press, Mar. 1, 2010, vol. 89, No. 3, pp. 635-641.

Falco et al: Hydrothermal Carbons from Hemicellulose-Derived Aqueous Hydrolysis Products as Electrode Materials for Supercapacitors, HemSusChem, 2013, vol. 6, pp. 374-382.

Falco et al: Tailoring the porosity of chemically activated hydrothermal carbons: Influence of the precursor and hydrothermal carbonization temperature. Carbon, vol. 62, Jun. 13, 2013, pp. 346-355.

Hao: Refining of hydrochars/hydrothermally carbonized biomass into activated carbons and their applications. Doctoral Thesis, Oct. 1, 2014, pp. 1-73.

Jain et al: Mesoporous activated carbons with enhanced porosity by optimal hydrothermal pre-treatment of biomass for supercapacitor applications. Microporous and Mesoporous Materials, vol. 218, Jun. 10, 2015, pp. 55-61.

Jain et al: Production of high surface area mesoporous activated carbons from waste biomass using hydrogen peroxide-mediated hydrothermal treatment for adsorption applications. A Chemical Engineering Journal, vol. 273, Mar. 28, 2015, pp. 622-629.

Lozano-Castell et al: Porous Biomass-Derived Carbons: Activated Carbons. Jun. 10, 2013, Sustainable Carbon Materials From Hydrothermal Processes, pp. 75-100.

Regmi et al: Removal of copper and cadmium from aqueous solutions using switchgrass biochar producted via hydrothermal carbonization process. Elsevier, vol. 109, 2012, pp. 61-69.

Yang et al: Development of high surface area mesoporous activated carbons from herb residues. Chemical Engineering Journal, Elsevier, vol. 167, No. 1, Dec. 6, 2010.

* cited by examiner

*Primary Examiner* — Stuart L Hendrickson
(74) *Attorney, Agent, or Firm* — Laine IP Oy

(57) ABSTRACT

The present invention discloses a method for the production of low ash activated charcoal from a carbon-containing raw material such as peat, in which method a damp mass of raw material is subjected to a hydrothermal carbonization process, in which the mass is heated to a temperature of 150 to 350 C and the process pressure increased to 10 to 40 bar, and the carbonized material obtained from the hydrothermal carbonization process is activated by heating it to a temperature above 400° C. The present invention further relates to the use of carbonized material obtained from the hydrothermal carbonization process for the production of activated charcoal.

14 Claims, 1 Drawing Sheet

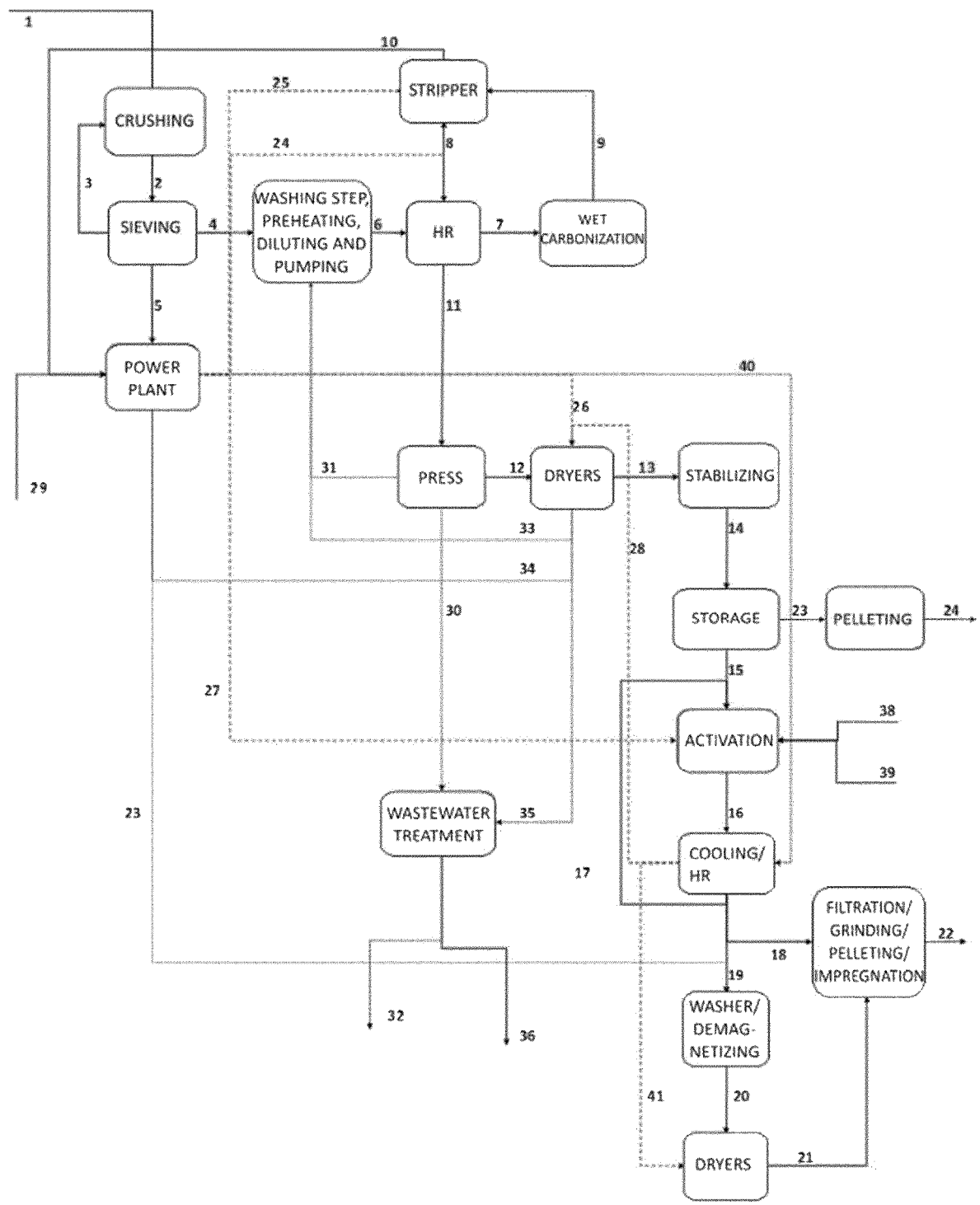

METHOD FOR THE PRODUCTION OF LOW ASH ACTIVATED CHARCOAL

FIELD OF THE INVENTION

The present invention relates to industrial processes for increasing the carbon content of carbon-containing raw material such as peat or wood with simultaneous lowering of the ash content, and particularly to methods for the production of activated charcoal.

BACKGROUND OF THE INVENTION

Carbon in itself is capable of binding onto its surface various organic substances and compounds, but this adsorption capacity can be significantly improved by activating the carbon. Carbon produced via activation is called activated charcoal.

Activated charcoal is a common and high-quality adsorbent, which is used in numerous filtration applications, particularly in the purification of gases and liquids, and as medicinal charcoal. Activated charcoal refers to highly pure carbon typically having a carbon content of 60 to 99%. Activated charcoal possesses a highly porous structure and thus a very large surface area per mass unit, typically 500 to 1500 $m^2/g$. The size of active surface area varies according to the raw material used and the degree of activation of the carbon. Due to the porous structure, 99% of the adsorption area of the activated charcoal exists in the internal parts of the charcoal. Activated charcoal is capable of binding approximately 10% of organic material into itself.

The structure of activated charcoal comprises micro-, meso- and macropores, their combined area indicating the quantity of the particles that the activated charcoal is able to adsorb. The size of the pores indicates the size of the particles that can be adsorbed to the surface of the activated charcoal. The pores are divided into three different size classes:

| micropores | <2 nm |
|---|---|
| mesopores | 2-50 nm |
| macropores | >50 nm |

To conform to the future use, it is possible to modify activated charcoal during the production stage, for example by altering its structure or pore size and surface area of the pores. Activated charcoal binds to its surface certain molecules or compounds either from gaseous or liquid material. Owing to its porous structure, activated charcoal also functions on the same principle as a sieve. The adsorption properties of activated charcoal are based on Van der Waals forces, whereby the adsorbed compounds are also readily releasable.

The adsorption capacity of activated charcoal can be enhanced by impregnation, i.e. additive treatment. The conditions for chemisorption are thereby created, and adsorption can be enhanced by up to 30% with respect to the desired compounds.

Activated charcoal is produced from carbon-containing raw materials. Owing to the low price of the raw material, more than 70% is produced from coal, with wood and coconut shell being the next most common raw materials. The latter raw materials are used especially when production of low ash and high quality activated charcoal is desired. In addition, peat has been utilized as raw material for activated charcoal. The chosen raw material is highly important regarding the properties of activated charcoal.

The production of activated charcoal typically consists of two main steps, coking and activation. In the first step the raw material is dried and ground to chunks of a suitable size. The carbon content of the carbon-containing raw material is then increased by coking at a temperature of at least 600° C. Coking is typically performed in two stages: first with slow elevation of temperature to the softening temperature to generate a maximally porous structure, the coking itself taking place subsequently in a furnace in the absence of oxygen. When necessary, chemicals can be used as auxiliary substances in the furnace.

In the second stage, coke is provided with the properties of activated charcoal through activation. Depending on the selected raw material and the desired final product, the activation can be performed either by using a physical or a chemical method. Activation is used to modify the number, size, distribution and diameter of the pores being generated in the charcoal. The use of chemical activation is most common with wood- and peat-based raw materials. In chemical activation, activating chemicals such as zinc chloride, alkali metal based catalysts or phosphoric acid or sulfuric acid are mixed with the charcoal, and the charcoal is subsequently heated to a temperature of 400 to 800° C. In physical activation, water steam or carbon dioxide or mixtures thereof are used as the gas. Steam activation is typically applied to the treatment of charcoal produced from coconut shell. This will result in a structure having small pores, and the adsorption surface is maximized.

Subsequent to activation, impurities such as ash are frequently washed off from the activated charcoal, either by aqueous or acid wash. The product can afterwards further be ground or pelleted. The typical mass efficiency of the production of activated charcoal from dry matter is clearly below 50%, for biomasses typically about 25%.

The majority of activated charcoal sold globally is in powder form, the rest being various kinds of granules and pellets. Powdered charcoal is mainly used for purifying liquids, the granular forms in the treatment of solutions and gaseous phases.

Global production and use of activated charcoal amounts to approx. 1.6 million tons (2015). The annual growth rate of the market is approx. 9%.

Low ash raw materials used for the production of activated charcoal, such as wood and coconut shell, are highly competed commodities. Raw materials with a high ash content such as coal, that are more readily available and inexpensive, require a more complex production process, and the activated charcoal produced from them is not of equally high quality.

In the conventional activated charcoal production process, ash is enriched into the activated charcoal, because it is carried through coking and activation directly into the final product, decreasing its active surface area and thus lowering its quality. If for instance the ash content in the dry matter of the raw material is 5% and carbon content 50%, typically 85% of the charcoal, ash in its entirety and approx. 40% of the other elements will after coking typically be carried into coke. The ash content has then already risen to 8%. During further activation the other elements most preferably vanish and approx. 50% of the carbon is carried into activated charcoal. Furthermore, the ash is carried as such into the final product. The ash content has then already risen to 19%. Ash impairs the properties of the final product by decreasing the proportion of active carbon.

As a final product, activated charcoal must typically comprise no more than 10% ash. With raw materials having a high ash content this means that the activated charcoal must after activation be washed in order to remove the ash from the material, also giving rise to significant additional costs.

Production processes that utilize peat as raw material have been in use for decades. Peat is an excellent raw material for the production of activated charcoal, but it must possess an exactly right quality. The ash content of peat must typically be as low as possible, preferably below 2% in the dry matter. In addition, the contents of sulfur, iron and calcium must also be as low as possible. The facilities producing activated charcoal with peat as raw material were initially built close to suitable peat deposits, but these deposits have now been exhausted and the producers meet with difficulties in finding peat fulfilling the requirements.

The production process of activated charcoal is highly energy intensive, the raw material requiring drying, grinding, coking and finally activation, as well as an ash washing step. This also increases the carbon footprint of the final product.

The conventional production process of activated charcoal does not remove ash from the raw material used during the process, but instead enriches it into the final product. For this reason a method should be found in which ash can be removed already during the coking step before activation, without sacrificing the porous structures of the charcoal.

The solution to this is replacement of the coking step with a hydrothermal carbonization (HTC) process (i.e. a wet carbonization process). Hydrothermal carbonization especially for peat has been studied since the beginning of the 20th century in Great Britain, Soviet Union and Sweden, among others. The facilities in longest operation were the Sosdala pilot plant in 1954-1964 in Sweden and the Boksitogorsk production plant in the Soviet Union in 1938-1976. In Finland, research was most active in the early 1980's. All of these processes have previously sought to produce a coal-like product by hydrothermal carbonization from damp raw material for energy production. Hydrothermal carbonization has been discussed e.g. in U.S. Pat. No. 4,153,420 (FI 56393) and U.S. Pat. No. 4,477,257 (FI 76592).

SUMMARY OF THE INVENTION

The object of the present invention is thus a method which allows the utilization of raw material having a higher ash content in the production of high-quality activated charcoal. In the activated charcoal production process according to the invention, removal of ash contained in the raw material is achieved by using a hydrothermal carbonization process instead of the prior art coking step.

The method according to the invention for the production of low ash activated charcoal from carbon-containing raw material comprises at least the steps of:
  subjecting a damp mass of raw material to a single- or multistage hydrothermal carbonization process, in which the mass of raw material is heated to a temperature of 150 to 350° C. and the process pressure increased to 10 to 40 bar; and
  activation of the carbonized material obtained from the drying step after the hydrothermal carbonization process in order to increase the carbon content and porosity by heating said material to a temperature above 400° C. and by using steam, carbon dioxide or activation chemicals or a mixture thereof in the activation.

The invention is also directed to the use of carbonized material obtained from the hydrothermal carbonization process for the production of activated charcoal.

BRIEF DESCRIPTION OF THE DRAWING

FIG. 1. Diagram of a commercial scale process. The numbered process transitions are described in the process example below.

ABBREVIATIONS

HR, heat recovery

Embodiments of the Invention

The present invention provides a method for the production of low ash activated charcoal from carbon-containing raw material such as peat, wood, lignin, suspensions and coconut shell, preferably from peat or wood, wherein the method comprises at least the steps of:
  subjecting a mass of damp raw material to a single- or multistage hydrothermal carbonization process, in which the mass of raw material is heated to a temperature of 150 to 350° C. and the process pressure increased to 10 to 40 bar; and
  activation of the carbonized material obtained from the drying step following the hydrothermal carbonization process in order to increase the carbon content and porosity by heating said material to a temperature above 400° C. and by using steam, carbon dioxide or activation chemicals or a mixture thereof in the activation.

In the method according to the invention, the dwell time of the raw material mass in the hydrothermal carbonization process is from 1 to 10 hours, preferably about 5 hours, depending on the raw material to be wet carbonized and the desired final product. In the activation step following the hydrothermal carbonization process, the typical dwell time in the activation furnace is from 1 to 20 hours, preferably from 1 to 10 hours.

In chemical activation, activating chemicals such as zinc chloride, alkali metal based catalysts or phosphoric acid or sulfuric acid are preferably mixed with the charcoal.

The solution disclosed in the invention for the production of activated charcoal is thus based on hydrothermal carbonization, in which a raw material having a moisture content of 60 to 95%, more preferably 80 to 90%, is heated under pressure to a temperature of 150 to 350° C. The pressure is subsequently lowered in a stepwise manner, whereby the water inside the structures such as cells of the raw material, reaches the boiling point, resulting in breakage of the polymers of the raw material of biological origin and dissolution of water-soluble extracts into the process water. These structural changes in the raw material weaken the water-binding capacity and remove hydrogen and oxygen from the raw material, leading to carbonization of the residual solid matter. The final product is a carbon product resembling lignite.

Owing to the process temperature that is lower than in coking, and to carbonization based on a pressure change, the typical porosity of the raw material is preserved in the process more reliably than in coking. The treatment, which is milder than coking, enables the production higher-quality activated charcoal products from the same raw material and decreases energy and raw material consumption in the activation.

The hydrothermal carbonization process takes place at a high moisture content, abolishing the need for drying prior to the process. Regardless of moisture, any biomass can thus be fed into the process. Furthermore, the hydrothermal carbonization process breaks the structure of the material, whereby there is no need to grind the raw material to a small particle size.

In hydrothermal carbonization, 10 to 40% of the biomass is dissolved into filtration water. These include typically sugars, organic acids and other hydrocarbon based compounds. In the same context the water-soluble components of the ash are also dissolved into the filtration water. In the next process step, the filtration water is separated from the carbonized solids by compression, resulting in removal of the dissolved ash components from the process. The process differs from the first step of the conventional production of activated charcoal, i.e. coking, in that the ash content of the carbon product being carried to activation can be lowered by 20 to 50%.

Because the raw material for hydrothermal carbonization must have a high moisture content, it can be subjected to a cost-effective washing step already before hydrothermal carbonization. In this washing step the ash content can be lowered also in respect of water-insoluble ash components. Examples of this pre-wash step are water washing, washing with a chemical solvent, acid washing and alkaline washing. Another alternative is the removal of ash components after the hydrothermal carbonization process. Hydrothermal carbonization as the first step in the production of activated charcoal thus enables the use of raw material with a higher ash content, as well as a final product having a higher quality.

In a preferred embodiment of the invention the mass of raw material is also preheated, preferably by using filtration water or other waste heat of the process, preferably to a temperature of 50 to 150° C., more preferably to a temperature of about 100° C. before hydrothermal carbonization. The preheating can be conducted after or in connection with the above-mentioned prewashing step. At this stage the biomass is usually at a moisture content of 65 to 95%.

In a preferred embodiment of the invention the solid and liquid reaction product obtained from the hydrothermal carbonization process is conveyed to mechanical dewatering on a press, after which the reaction product preferably dried to a dry matter content of about 50% is transferred onto a dryer, where it is subjected to drying, typically by using steam, preferably to a moisture content of less than 10%.

In a preferred embodiment of the invention the method comprises the steps of:
a) sieving the raw material according to particle size for the hydrothermal carbonization process;
b) diluting the sieved mass of raw material obtained from step a) with water and preheating the diluted mass of raw material;
c) increasing the process pressure to 10 to 40 bar and transferring the mass of raw material obtained from step b) to the hydrothermal carbonization process and heating the mass of raw material to a temperature of 150 to 350° C. for 1 to 10 hours;
d) drying of mass obtained from step c);
e) activating the dried carbonized material obtained from step d) by heating it to a temperature of 400 to 1100° C. for 1 to 20 hours by using steam, carbon dioxide or activation chemicals or a mixture thereof in the activation;
f) cooling the activated charcoal obtained from step e).

Finally, the cooled activated charcoal obtained from step f) is preferably ground or pelleted into a form suitable for the application.

Process Example

The process is fed with (1) carbon-based bio-raw material, typically peat. If necessary, the chunk size of the raw material is rendered suitable by crushing prior to conveying to sieving (2). The oversized fraction of sieving is recycled to crushing (3).

The raw material processed to a suitable chunk size is fed (4) to the hydrothermal carbonization process, in which the first step consists of possible washing of impurities, such as ash components, preheating, dilution and pumping of the mass. The biomass is preheated and diluted to a moisture content of 60 to 95% by conveying into it process water (31 and 33) both from the mechanical pressing after hydrothermal carbonization as well as from the drying of the possibly wet carbonized product (34). The aim is a moisture content of about 80 to 90%.

The temperature of the biomass is from 50 to 150° C., typically about 100° C., when it is being pumped to the actual hydrothermal carbonization process (6), the pressure is at this stage increased to 10 to 40 bar, typically about 20 to 30 bar. This is accompanied with a heating and heat recovery step, in which the leaving mass heats the incoming mass. The biomass is further preheated with steam at 30 bar (24). Hydrothermal carbonization takes typically place in the same reactor as heat recovery, into which the biomass rendered to a temperature of 180 to 300° C. and pressure of 20 to 30 bar is conveyed (7). Dwell time in hydrothermal carbonization is from 1 to 10 hours, typically about 5 hours. In hydrothermal carbonization, pressure changes in combination with the selected temperature level remove soluble and oxygen-containing compounds from the solid biomass, thus enabling the increase in carbon content. The gaseous compounds formed in the process, typically carbon dioxide, are removed into a stripper (8, 9), where they are stripped with steam (25). Stripping refers to a unit process, in which one or more components are removed from the liquid phase by using steam. During stripping, the component being removed is evaporated with steam out of the liquid stream. What is left is the flue gas (10) of hydrothermal carbonization, which is most preferably treated in a power plant integrated with the facility and produces the heating power required by the process, mainly as vapors, simultaneously using as energy the combustible gases (23) of the process as well as solid biomass (5) which is incompatible with the hydrothermal carbonization process. For securing the energy balance, external fuel (29) can also be fed into the power plant.

The solid and liquid reaction product (11) exiting the hydrothermal carbonization is led to mechanical dewatering onto a press, where it can typically be dried to a dry matter content of 20 to 60%, typically about 50%. Warm filtration water is being recycled (31) for preheating and diluting the supplied biomass to 100° C. degrees and a moisture of 80%. Part of the filtration water is removed to waste water treatment (30). This also includes the water-soluble components of ash, typically from 20 to 50% of the quantity of the ash.

The biocharcoal that has been carbonized and diminished in regard of ash components is led at a dry matter content of about 50% to steam dryers, where it is dried by using vapors (26, 28) as dry as possible, typically to a moisture content of less than 10%. Water possibly recovered from the steam dryer is recycled either to dilution (33) or wastewater treatment (35). Depending on the type of dryer, the water can also be removed into air. The condensate is returned to the power plant (34). In wastewater treatment, solids and impurities in water are separated for disposal or possible later utilization (36), and the purified water can be removed from the plant (32).

The washed HTC charcoal (13) is conveyed to the activation section, which is prior art and chosen in order to achieve the best activation result according to the client's needs. When necessary, HTC charcoal is stabilized (13) and stored (14) for further processing. The biomass that has been in intermediate storage and wet carbonized can be conveyed to pelleting (23), from where it can be delivered elsewhere for further processing (24), or otherwise directly transferred to activation (15). Activation aims to create active properties for the charcoal so that it will function as a maximally effective adsorber. This is typically accomplished by raising the temperature of the charcoal to 400 to 1100° C. by a specifically constructed shaft kiln or similar. This takes place by utilizing the energy of an external fuel (39) or gases generated in the activation (17), by burning them in the activation furnace. In addition to temperature, activation of charcoal is, when required, supported by using gas, typically either steam (27) or carbon dioxide or other chemicals (38). The dwell time in the activation furnace is from 1 to 20 hours, most preferably from 1 to 10 hours. Activation gives rise to a significant amount of gas having a high thermal value. The gas is cooled and the generated energy utilized (16). The energy contained in the gas is utilized both in the activation furnace (17) and for producing vapors at the power plant (23). Energy generated from cooling of the gas and activated charcoal is recovered by vaporization of the feed water (40). The generated vapor (28) is utilized at the steam dryers, for example.

The cooled activated charcoal in powder form can be directly transferred to final processing (18) tailored to the client's needs, where the charcoal is ground or pelleted to a form that is suitable for the application. It can also be impregnated with compounds in order to obtain special properties. The finished, application-tailored activated charcoal (22) is delivered to the client.

When necessary, the activated charcoal is conveyed to a washing step (19), after which the charcoal must be dried (20), most preferably by using vapor (41) generated in the preceding step. After drying, the activated charcoal is subjected to the above-mentioned operations (21).

REFERENCE PUBLICATIONS

U.S. Pat. No. 4,153,420
U.S. Pat. No. 4,477,257

The invention claimed is:

1. A method for the production of activated charcoal from peat, the method comprising:
    subjecting a mass of peat having a moisture content to a single- or multistage hydrothermal carbonization process, in which the mass of peat is heated to a temperature of 150 to 350° C. and the process pressure increased to 10 to 40 bar to produce a carbonized material;
    drying the carbonized material; and
    activating the carbonized material obtained from the drying step in order to increase the carbon content and porosity of the carbonized material, wherein the activating is done by heating said carbonized material to a temperature above 400° C. and by using steam, carbon dioxide or activation chemicals or a mixture thereof, and wherein the activating produces the activated charcoal.

2. The method according to claim 1, wherein the dwell time of the mass of peat in the hydrothermal carbonization process is from 1 to 10 hours.

3. The method according to claim 1, wherein the dwell time of the carbonized material obtained from the hydrothermal carbonization process in the activation step is from 1 to 20 hours.

4. The method according to claim 1, wherein the mass of peat is heated in the hydrothermal carbonization process to a temperature of 180 to 300° C.

5. The method according to claim 1, wherein the moisture content of the mass of peat in the hydrothermal carbonization process is above 60%.

6. The method according to claim 1, wherein the activation chemicals comprise zinc chloride, an alkali metal based catalyst, phosphoric acid, or sulfuric acid.

7. The method according to claim 1, wherein the carbonized material obtained from the hydrothermal carbonization process is heated to a temperature of 400 to 1100° C. in the activating step.

8. The method according to claim 1, wherein the method further comprises a washing step of the mass of peat prior to the hydrothermal carbonization process in order to decrease ash components.

9. The method according to claim 1, wherein the mass of peat is preheated prior to the hydrothermal carbonization process to a temperature of 50 to 150° C.

10. The process of claim 1, wherein the moisture content of the mass of peat is from 80-90%.

11. The method according to claim 1, wherein solid and liquid reaction products obtained from the hydrothermal carbonization process are conveyed to mechanical dewatering on a press, after which the reaction product is transferred onto a dryer and dried to a dry matter content of about 50% is transferred.

12. The method according to claim 1, wherein the method comprises the steps of:
    a) sieving the mass of peat according to particle size for the hydrothermal carbonization process;
    b) diluting the sieved mass of peat obtained from step a) with water and preheating the diluted mass of peat;
    c) increasing the pressure to 10 to 40 bar and transferring the diluted mass of peat obtained from step b) to the hydrothermal carbonization process and heating the diluted mass of peat to a temperature of 150 to 350° C. for 1 to 10 hours to generate the carbonized material;
    d) drying of carbonized material obtained from step c);
    e) activating the dried carbonized material obtained from step d) by heating it to a temperature of 400 to 1100° C. for 1 to 20 hours by using steam, carbon dioxide or activation chemicals or a mixture thereof to produce the activated charcoal; and
    f) cooling the activated charcoal obtained from step e).

13. The process of claim 1, wherein the drying step is done to a dry matter content of 20-60%.

14. The process of claim 1, wherein the activated carbon comprises no more than 10% dry matter of ash.

* * * * *